Oct. 3, 1961     K. LARCHÉ     3,002,785
DEVICE FOR HOLDING A COVER OF A VEHICLE
OPENING IN A DESIRED POSITION
Filed Nov. 10, 1958     2 Sheets-Sheet 1
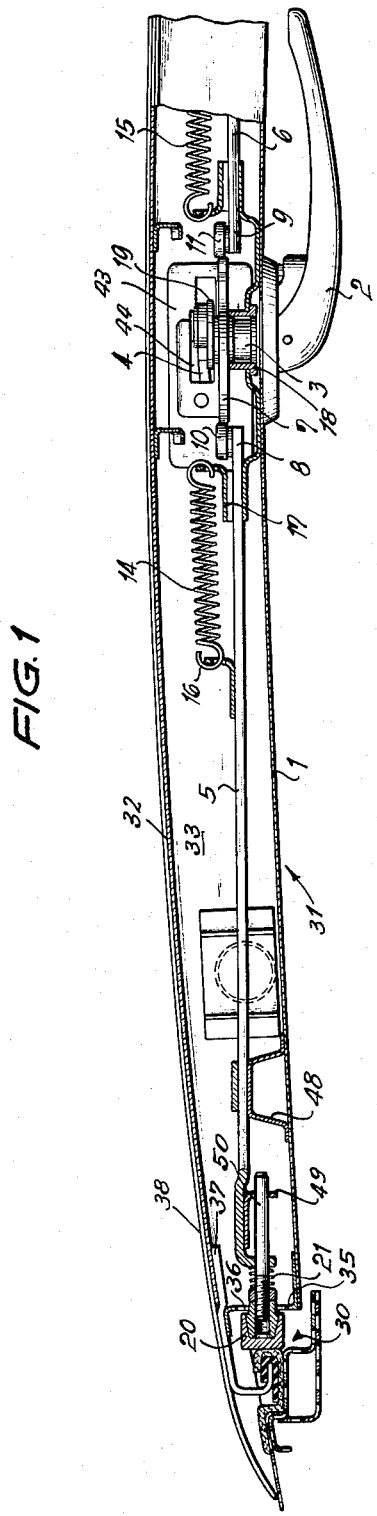
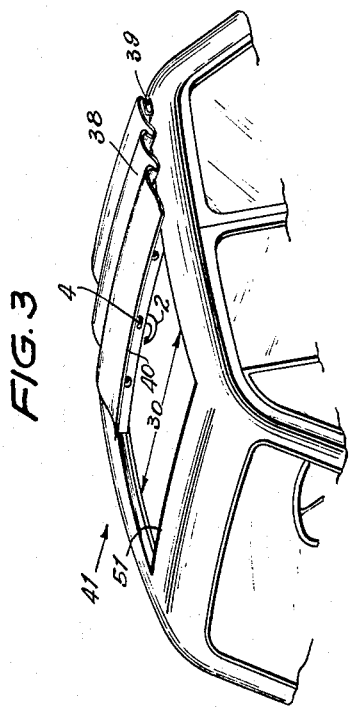
INVENTOR
Kurt LARCHÉ
BY MICHAEL S. STRIKER
ATTORNEY Oct. 3, 1961

K. LARCHÉ

3,002,785

DEVICE FOR HOLDING A COVER OF A VEHICLE
OPENING IN A DESIRED POSITION

Filed Nov. 10, 1958

INVENTOR
Kurt LARCHÉ

BY MICHAEL J. STRIKER
ATTORNEY

United States Patent Office 3,002,785
Patented Oct. 3, 1961

3,002,785
DEVICE FOR HOLDING A COVER OF A VEHICLE OPENING IN A DESIRED POSITION
Kurt Larché, Stockdorf, near Munich, Germany, assignor to Firma Wilhelm Baier K.G., Stockdorf, near Munich, Germany
Filed Nov. 10, 1958, Ser. No. 772,895
Claims priority, application Germany Nov. 13, 1957
2 Claims. (Cl. 296—120)

The present invention relates to devices for maintaining an opening of a vehicle or the like covered to a desired extent.

For example, certain vehicles have open roofs provided with covers which are capable of being shifted over the roof openings to maintain the roof opening open or closed to a desired extent.

It is an object of the present invention to provide for a device of this type a means for holding the cover in a desired position which is very quiet in operation as well as taking up an extremely small amount of space and being very easy to operate.

Another object of the present invention is to provide a device of the above type which will have no undesirable play in its parts so that there will be a minimum of rattling and which at the same time can be conveniently operated by the operator so as to be able to releasably hold a vehicle roof, for example, in a desired position.

With the above objects in view, the present invention includes in a device for holding a cover of a vehicle opening in a desired position, a pair of substantially parallel elongated guides which define between themselves an opening of the vehicle. An elongated hollow housing extends transversely of these guides therebetween and cooperates with the guides to be guided thereby for movement longitudinally along the guides. This housing may be connected, for example, to the front end of a shiftable roof member. An operating handle has a predetermined turning axis and is located intermediate the ends of the elongated housing in a position accessible to the operator, and a pair of elongated brake rods extend longitudinally along the hollow interior of the housing on opposite sides of the turning axis of the operating handle respectively toward the pair of guides for the housing. A pair of brake means are respectively located at the outer ends of the brake rods, and when these rods are in an outer operating position the pair of brake means respectively engage the pair of guides to hold the housing at a predetermined position along the guides. These brake rods also have an inner idle position where they are nearer to the turning axis of the operating handle and where the pair of brake means do not cooperate with the pair of guides to releasably hold the housing at a preselected position. A bearing means is carried by the housing and serves to support the operating handle for turning movement about the above axis as well as the pair of brake rods for longitudinal movement toward and away from the pair of guides. A spring means cooperates with the rods for urging the latter inwardly toward the turning axis of the handle to their inner idle position, and a cam means is connected to the operating handle for turning movement therewith and cooperates with the rods to move the latter in opposition to the spring means outwardly to their outer operating position when the handle is turned. This cam is of a substantially S-shaped configuration and cooperates with rollers carried by the rods so that the entire construction is very quiet in operation, has a minimum of loose rattling parts, and requires but little space so that it can easily be accommodated within an elongated hollow housing of small cross section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional elevational view taken through an elongated housing of the device of the invention and illustrating the structure of the invention which is located within this housing, FIG. 1 showing the details of the structure on the left side of the operating handle, the structure on the right side having the same construction as the structure on the left side;

FIG. 3 shows the manner in which the structure of the invention cooperates with a shiftable roof member of a vehicle such as an automobile.

Figure 2:
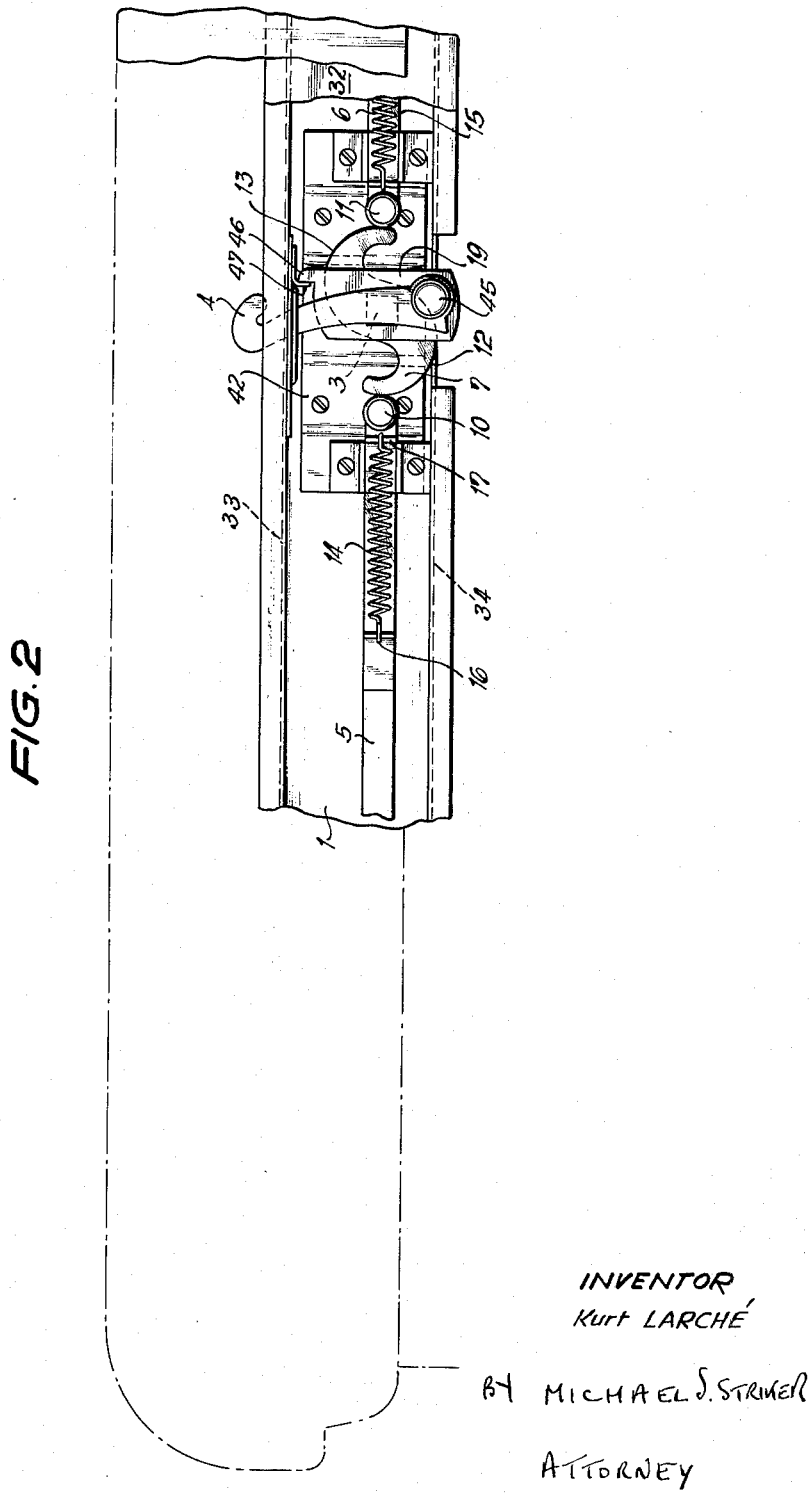
FIG. 2 is a fragmentary top plan view of the structure of FIG. 1 in the region of the operating handle thereof.

Referring now to the drawings, there is shown in FIG. 3 a vehicle such as an automobile, for example, having an open roof 41. A pair of parallel spaced guides 30 define between themselves the opening of the roof 41, and the roof opening is adapted to be covered to a preselected extent by flexible cover member 38 made of any suitable sheet material. The cover member 38 is fixed at its rear end 39 to the rear end of the roof opening and at its front end 40 the cover 38 is fixed to the structure of the invention which can be operated to maintain the cover at a preselected position such as, for example, that illustrated in FIG. 3.

Referring now to FIG. 1, the structure of the invention includes an elongated hollow housing 31 extending between the guides 30 transversely thereof and cooperating with the pair of parallel guides 30 to be guided thereby for movement longitudinally along the guides 30. One of the guides 30 is shown in detail at the left of FIG. 1. The hollow housing 31 has a bottom wall 1 and a top wall 32 to which the roof cover 38 is fixed in any suitable way, this cover 38 extending beyond the housing 31 and covering the guides 30 in the manner shown in FIGS. 1 and 3. The housing 31 also has a front wall 33 and a rear wall 34 (FIG. 2). Also, the housing 31 has a pair of opposite end walls 35 respectively located adjacent to the guides 30 and respectively formed with openings 36, as shown at the left of FIG. 1. The structure shown in FIG. 1 to the left of the operating handle 2 is repeated on the right side of the handle 2.

This handle 2 is located at the exterior of the housing 31 so that it is accessible to the operator, and it will be noted that the handle 2 is located substantially midway between the ends of the housing 31 in a position where it is directed toward the interior of the automobile, as is clearly evident from FIG. 3. At the connection between the top wall 32 and the end walls 35 of the housing 31, the latter is provided with a pair of substantially hook-shaped members 37 which have free ends respectively extending into the guides 30 to cooperate with the latter in the manner shown at the left of FIG. 1.

The housing 31 carries in its interior a bearing means 42 (FIG. 2) which is in the form of a plate fixed to the upper surface of the bottom wall 1 of the housing 31. This bearing means includes a tubular bearing sleeve 18 (FIG. 1) in which a shaft portion 3 fixed to the handle 2 is turnable, so that the handle 2 together with its shaft portion 3 is turnable about a vertical axis passing vertically through the housing 31, as viewed in FIG. 1. Above the shaft portion 3, the handle 2 is provided with a square portion fixed integrally to the shaft portion 3 and located in an opening of a cam means 7 shown most clearly in FIG. 2, so that the cam means 7 is constrained to turn with the handle 2 about the axis of the shaft 3, Furthermore, this square portion fixed integrally with and extending upwardly from the shaft portion 3 extends into a square opening of a flat substantially rectangular plate 19 shown in FIG. 2, so that the plate 19 turns together with the cam 7, the shaft 3, and the handle 2. Any suitable collars or the like are provided for maintaining the handle 2 and the shaft 3 at the elevation thereof shown in FIG. 1, so that these elements can turn about the axis of the shaft 3 but cannot move axially. The plate 19 carries a pivot pin 45 which is spaced from the axis of the shaft 3 and which serves to pivotally connect an elongated lock member 4 to the plate 19, so that the plate 19 serves to connect the lock member 4 eccentrically to the handle 2. The elongated substantially hook-shaped lock member 4 has a front hooked end extending with clearance through a slot 44 formed in a plate 43 which is fixed to the inner surface of the front wall 33 of the housing 31 over an opening of the front wall 33.

The structure of the invention further includes a pair of elongated brake rods 5 and 6 respectively located on opposite sides of the turning axis of the operating handle 2 and extending along a line which passes across the axis of the shaft 3 to the pair of parallel guides 30.

The rods 5 and 6 have an outer operating position which is illustrated in FIG. 1 and an inner idle position where they are nearer to the axis of the shaft 3 than the position of these rods shown in FIG. 1. A brake means is carried by the rods 5 and 6 respectively at their outer ends to cooperate respectively with the pair of guides 30 for releasably holding the front end of the cover 38 at a desired position along the guides 30. Each of these brake means includes, as shown at the left of FIG. 1, a brake 20 carried by a tubular threaded sleeve which is threadedly connected with a rod 50 which extends slidably through an opening formed in the downwardly turned left end of the rod 5, as shown in FIG. 1, the rod 6 and the brake means carried thereby being constructed in the same way. The rod 5 carries a bracket 49 formed with an opening through which the rod 50 also extends slidably, and a spring 21 is located around the rod 50 between the rod 5 and the sleeve which carries the brake 20, so that the rod 5 acts on the brake 20 through the spring 21 as is apparent from FIG. 1. The brake means and rod 6 are constructed in the same way. The brake 20 is capable of passing freely through the opening 36 and is shown in a position pressing against the left guide 30 of FIG. 1 for releasably holding the housing 31 at a desired position.

The bearing means 42 includes in addition to the sleeve 18 which forms a bearing for the shaft 3 a pair of additional guides 17 through which the rods 5 and 6 respectively pass freely. These guides 17 are in the form of tubular portions of the bearing means 42, and as is evident from FIG. 1, each of these tubular guide portions has an upwardly directed extension formed with an opening which serves to connect a spring to the bearing means 42. Thus, as may be seen from FIG. 1, a pair of coil springs 14 and 15 are respectively connected at their ends nearest to the turning axis of the handle 2 to the upwardly extending lugs of the tubular guides 17. At their opposite outer ends 16 the pair of springs 14 and 15 are respectively fixed to a pair of brackets respectively carried by the rods 5 and 6, so that the springs 14 and 15 form a spring means cooperating with the pair of brake rods 5 and 6 for urging the latter inwardly toward their inner idle position where they are nearer to the shaft 3 than shown in FIG. 1 and where the pair of brake means 20 do not cooperate with the pair of guides 30, respectively, so that in the inner idle position of the brake rods 5 and 6 the housing 31 can be easily moved by the operator longitudinally along the pair of guides 30.

The cam means which is fixed to the operating handle 2 for turning movement therewith includes in addition to the substantially S-shaped cam 7 a pair of rollers 10 and 11 which are respectively supported for free turning movement by the inner ends 8 and 9 of the rods 5 and 6, respectively. It will be noted that the rollers 10 and 11 are turnable about a pair of axes, respectively, which are substantially parallel to the turning axis of the handle 2. Furthermore, the rollers 10 and 11 are respectively located at the same elevation as the cam 7, so that the springs 14 and 15 serve to maintain the rollers 10 and 11 at all times in engagement with the periphery of the cam 7. The cam 7 is in a form of a flat plate which is located in a plane normal to the axis of the shaft 3, and the cam 7 includes a pair of arcuate peripheral camming portions 12 and 13 respectively cooperating with the rollers 10 and 11. Each of the camming portions 12 and 13 extends along an arc of a circle through approximately 180°.

Between the bearing means 42 and the pair of brake means 20 the housing 31 carries in its interior a pair of tubular guides 48 which also serve to guide the pair of rods 5 and 6 for longitudinal shifting movement.

The parts are shown in FIGS. 1 and 2, in an operating position holding the housing 31 at a desired position along the guide 30, and in this position it will be noted that a tongue 46 of the plate 19 engages a stop member 47 carried by the front wall 33 to limit the turning movement of the operating handle 2 in a counterclockwise direction, as viewed in FIG. 2, so that in this way the operating position of the rods 5 and 6 is carefully determined.

When the operating handle 2 is turned so that the cam 7 turns in a clockwise direction, as viewed in FIG. 2, then the rollers 10 and 11 respectively ride along the camming peripheral portions 12 and 13 of the cam 7 until the rollers become located at the pair of opposed loop portions of the cam 7 at a position much closer to the turning axis of the operating handle, the springs 14 and 15 returning the rods 5 and 6 to their inner idle position at this time. It will be noted that the lock member 4 will move forwardly through the front wall 33 of the housing 31 at this time. The hook member 4 is adapted to extend into an opening formed in a transverse member 51 located at the front end of the roof opening, as shown in FIG. 3, and this hook member is adapted to engage a part of the member 51 when the parts are returned to the position shown in FIG. 2 for positively locking the cover 33 in its position fully closing the opening of the roof. The hook member 4 has a curved configuration which enables it to cooperate with the edge of the opening through which it extends so that it will be turned about the pivot pin 45 to angular positions which enables hook member 4 to cooperate properly with the member 51 for locking and unlocking the housing 31 in a position next to the member 51.

It will be noted from FIG. 2 that the rods 5 and 6 extend along a common axis which is perpendicular to the axis of the shaft 3 so that the springs 14 and 15 act in direct opposition to each other and thus exert no tendency to turn the cam 7 independently of the handle 2.

The element shown in FIG. 1 to the right of support 48 and behind the rod 5 is a projection which projects forwardly from the front wall 33 of the housing 31 to enter into an opening in member 51 when the cover 38 is in its forwardmost position so as to prevent lateral shifting of the housing 31. A similar element is located at the right side of the housing not shown in FIG. 1, and the pair of locating projections are visible in FIG. 3 on opposite sides of the closure hook 4 just beneath the front edge of the cover 38.

It will be noted from FIGS. 1 and 2 that the structure of the invention is exceedingly compact and requires only a small amount of space. Furthermore, because the springs 14 and 15 continuously urge the rollers 10 and 11 against the peripheral portions 12 and 13 of the cam 7, respectively, all play is eliminated and the parts operate very quietly and with no rattling. Furthermore, the device is easy to operate and the handle 2 is conveniently accessible at all times.

Of course, the invention is not limited to the example illustrated. For example, the spring means 14, 15 may have a different construction, and other types of rollers 10 and 11 may be provided to cooperate with the cam. Moreover, the locking structure 4, 19 may have any desired construction.

It will be understood that each of the elements described above, or two or more together, may also find a useful application in other types of devices for holding a cover of an opening in a desired position differing from the types described above.

While the invention has been illustrated and described as embodied in devices for holding a cover of a vehicle opening in a desired position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle, in combination, a pair of spaced substantially parallel guides defining between themselves an opening of a vehicle; an elongated hollow housing extending between and guided by said guides for movement therealong, said housing being adapted to be connected to a cover which covers said opening to a degree determined by the position of said housing along said guides; an operating handle located at the exterior of said housing between the ends thereof and having a predetermined axis and a portion along said axis projecting into said hollow housing; a pair of elongated brake rods respectively located on opposite sides of said axis and extending therefrom respectively in opposite directions along the interior of said hollow housing toward said guides; a pair of brake means respectively carried by said rods at ends thereof respectively located distant from said axis and adapted to engage said guides, respectively, for holding said housing in a desired position when said rods are in an outer operating position distant from said axis, said rods being movable from said outer operating positions thereof to an inner idle position nearer to said axis where said pair of brake means are respectively spaced from said pair of guides; bearing means carried by said housing and supporting said handle for turning movement about said axis and said rods for longitudinal movement between the outer operating and inner idle positions; spring means cooperating with said rods for urging the latter inwardly toward their inner idle position; cam means including a cam member of substantially S-shaped configuration and carried by said handle portion in the interior of said housing for turning movement with said handle and having outer arcuate edge faces cooperating with said rods for moving the latter in opposition to said spring means from their inner idle to their outer operating position when said handle and said cam means therewith are turned in one direction, turning of said handle in an opposite direction resulting in a release of said rods to the force of said spring means which returns said rods to their inner idle position freeing said housing for movement along said guides; a plate carried by said handle for turning movement therewith; and a latch member mounted on said plate turnably about an axis spaced from said turning axis of said handle, said latch member having a hook-shaped free end extending beyond said housing and moving between an active position in which said hook-shaped end is close to said housing and an inactive position in which said end is further spaced from said housing during turning of said handle in opposite directions, respectively, said hook-shaped end being in said active position slightly before said rods have been moved by said cam means to their outer operative position and said latch member being adapted in the active position of the hook-shaped end thereof to secure said cover in a position where it fully covers said opening.

2. In a vehicle, in combination, a pair of spaced substantially parallel guides defining between themselves an opening of a vehicle; an elongated hollow housing extending between and guided by said guides for movement therealong, said housing being adapted to be connected to a cover which covers said opening to a degree determined by the position of said housing along said guides; an operating handle located at the exterior of said housing between the ends thereof and having a predetermined axis and a portion along said axis projecting into said hollow housing; a pair of elongated brake rods respectively located on opposite sides of said axis and extending therefrom respectively in opposite directions along the interior of said hollow housing toward said guides; a pair of brake means respectively carried by said rods at ends thereof respectively located distant from said axis and adapted to engage said guides, respectively, for holding said housing in a desired position when said rods are in an outer operating position distant from said axis, said rods being movable from said outer operating positions thereof to an inner idle position nearer to said axis where said pair of brake means are respectively spaced from said pair of guides; bearing means carried by said housing and supporting said handle for turning movement about said axis and said rods for longitudinal movement between the outer operating and inner idle positions; spring means cooperating with said rods for urging the latter inwardly toward their inner idle position; a substantially S-shaped cam member carried by said handle portion for turning movement therewith in the interior of said hollow housing and having a pair of opposite arcuate peripheral camming edge faces respectively cooperating with said rods and each extending along a circular arc of approximately 180° and cooperating with said rods for moving the latter in opposition to said spring means from their inner idle to their outer operating position when said handle and said cam means therewith are turned in one direction, turning of said handle in an opposite direction resulting in a release of said rods to the force of said spring means which returns said rods to their inner idle position freeing said housing for movement along said guides; a plate carried by said handle for turning movement therewith; and a latch member mounted on said plate turnably about an axis spaced from said turning axis of said handle in a direction transverse to a line passing through points of said pair of opposed camming portions spaced farthest from said turning axis of said handle, said latch member having a hook-shaped free end extending beyond said housing and moving between an active position in which said hook-shaped end is close to said housing and an inactive position in which said end is further spaced from said housing during turning of said handle in opposite directions, respectively, said hook-shaped end being in said active position slightly before said rods have been moved by said cam means to their outer operative position and said latch member being adapted in the active position of the hook-shaped end thereof to secure said cover in a position where it fully covers said opening.

References Cited in the file of this patent

UNITED STATES PATENTS

| 2,242,844 | Baier et al. | May 20, 1941 |

FOREIGN PATENTS

| 400,377 | Great Britain | Oct. 26, 1933 |
| 528,303 | Great Britain | Oct. 25, 1940 |
| 633,110 | France | Oct. 22, 1927 |